(12) United States Patent
Quittek et al.

(10) Patent No.: US 8,370,497 B2
(45) Date of Patent: Feb. 5, 2013

(54) METHOD FOR TIME-SYNCHRONOUS DATA TRANSFER

(75) Inventors: Jürgen Quittek, Heidelberg (DE); Cristian Cadar, Heidelberg (DE)

(73) Assignee: NEC Corporation, Tokyo (JP)

( * ) Notice: Subject to any disclaimer, the term of this patent is extended or adjusted under 35 U.S.C. 154(b) by 2112 days.

(21) Appl. No.: 10/294,768

(22) Filed: Nov. 15, 2002

(65) Prior Publication Data

US 2003/0131121 A1    Jul. 10, 2003

(30) Foreign Application Priority Data

Nov. 16, 2001 (DE) .................................. 101 56 115
Jul. 4, 2002 (DE) .................................. 102 30 248

(51) Int. Cl.
*G06F 15/16* (2006.01)
*H04L 12/28* (2006.01)

(52) U.S. Cl. ........ 709/227; 709/223; 709/225; 709/226; 709/228; 709/229; 709/230; 709/231; 709/232; 709/236; 709/237; 709/238; 709/244; 370/230; 370/230.1; 370/231; 370/232; 370/233; 370/234; 370/235; 370/235.1; 370/236; 370/252; 370/352; 370/356; 370/357; 370/351; 370/386; 370/392; 370/396; 370/390; 370/395.2; 370/395.21; 370/395.4; 370/395.43; 379/210.01; 379/211.01; 379/211.02; 379/212.01; 379/221.01; 379/265.01; 379/201.01; 455/445; 455/435.3

(58) Field of Classification Search .................. 370/236, 370/252, 352, 356, 390, 395.4, 395.43, 230, 370/230.1, 231, 232, 233, 234, 235, 235.1, 370/357, 351, 386, 392, 396, 395.2, 395.21; 709/395.4, 395.43, 223, 225, 226, 227, 228, 709/229, 230, 231, 232, 236, 237, 238, 244; 379/210.01, 211.01, 211.02, 212.01, 221.01, 379/265.01, 201.01; 455/445, 435.3
See application file for complete search history.

(56) References Cited

U.S. PATENT DOCUMENTS
(Continued)

FOREIGN PATENT DOCUMENTS

| DE | 19809593 | 9/1999 |
|---|---|---|
| EP | 1120939 | 8/2001 |

(Continued)

OTHER PUBLICATIONS

Schulzrinne et al, The Session Initiation Protocol: Internet-Centric Signalling, Oct. 2000, Communication Magazine, IEEE, vol. 38, Issue: 10, pp. 134-141.*

(Continued)

*Primary Examiner* — Khanh Dinh
*Assistant Examiner* — Saket K Daftuar
(74) *Attorney, Agent, or Firm* — Sughrue Mion, PLLC

(57) ABSTRACT

A method for transferring time-synchronous data, particularly voice and video data, over a network, particularly the Internet, between at least two terminals, where between the terminals a connection is established using a SIP server and where the SIP protocol is used for establishing the connection, is—with respect to high Quality of Service for transferring time-synchronous data and with a technically simple and cost effective design—developed in a way that the SIP server analyzes the connection and/or the terminals or the like and that based on the analysis it determines an ideal bandwidth for optimizing the transfer of time-synchronous data.

4 Claims, 2 Drawing Sheets

U.S. PATENT DOCUMENTS

| | | | |
|---|---|---|---|
| 6,058,113 A | 5/2000 | Chang | |
| 6,141,686 A | 10/2000 | Jackowski et al. | |
| 6,157,648 A | 12/2000 | Voit et al. | |
| 6,366,577 B1* | 4/2002 | Donovan | 370/352 |
| 6,377,579 B1* | 4/2002 | Ofek | 370/395.4 |
| 6,421,674 B1* | 7/2002 | Yoakum et al. | 707/10 |
| 6,434,143 B1* | 8/2002 | Donovan | 370/356 |
| 6,512,818 B1* | 1/2003 | Donovan et al. | 379/88.18 |
| 6,560,231 B1* | 5/2003 | Kawakami et al. | 370/395.43 |
| 6,560,329 B1* | 5/2003 | Draginich et al. | 379/265.02 |
| 6,600,735 B1* | 7/2003 | Iwama et al. | 370/352 |
| 6,633,569 B2* | 10/2003 | Hemmady | 370/398 |
| 6,678,264 B1* | 1/2004 | Gibson | 370/352 |
| 6,680,943 B1* | 1/2004 | Gibson et al. | 370/392 |
| 6,681,252 B1* | 1/2004 | Schuster et al. | 709/227 |
| 6,735,175 B1* | 5/2004 | Havens | 370/236 |
| 6,738,390 B1* | 5/2004 | Xu et al. | 370/467 |
| 6,741,586 B1* | 5/2004 | Schuster et al. | 370/352 |
| 6,753,900 B2* | 6/2004 | Runcie et al. | 348/14.16 |
| 6,788,676 B2* | 9/2004 | Partanen et al. | 370/352 |
| 6,870,817 B2* | 3/2005 | Dolinar et al. | 370/252 |
| 6,958,994 B2* | 10/2005 | Zhakov et al. | 370/352 |
| 6,961,575 B2* | 11/2005 | Stanforth | 455/445 |
| 7,136,387 B2* | 11/2006 | Gallant et al. | 370/395.52 |
| 7,218,722 B1* | 5/2007 | Turner et al. | 379/221.02 |
| 7,260,060 B1* | 8/2007 | Abaye et al. | 370/230 |
| 8,185,615 B1* | 5/2012 | McDysan et al. | 709/223 |
| 2003/0133454 A1* | 7/2003 | Gallant et al. | 370/395.1 |

FOREIGN PATENT DOCUMENTS

| | | |
|---|---|---|
| JP | 2001-274833 A | 10/2001 |
| WO | WO 01/35604 A2 | 5/2001 |
| WO | WO 01/35680 | 5/2001 |

OTHER PUBLICATIONS

Donovan et al, SIP 183 Session Progress Message,Oct. 1999, Internet Draft, Interent Engineering Task Force, http://www3.ietf.org/proceedings/99nov/I-D/draft-ietf-sip-183-00.txt.*

Veltri Luca, Stefano Salsano, Donald Papalilo, "SIP Extensions fo QoS support in Diffserv networks," Internet draft <draft-veltri-sip-qsip-00.txt>, Oct. 2001, Internet, Date retrieved: Oct. 17, 2007.

* cited by examiner

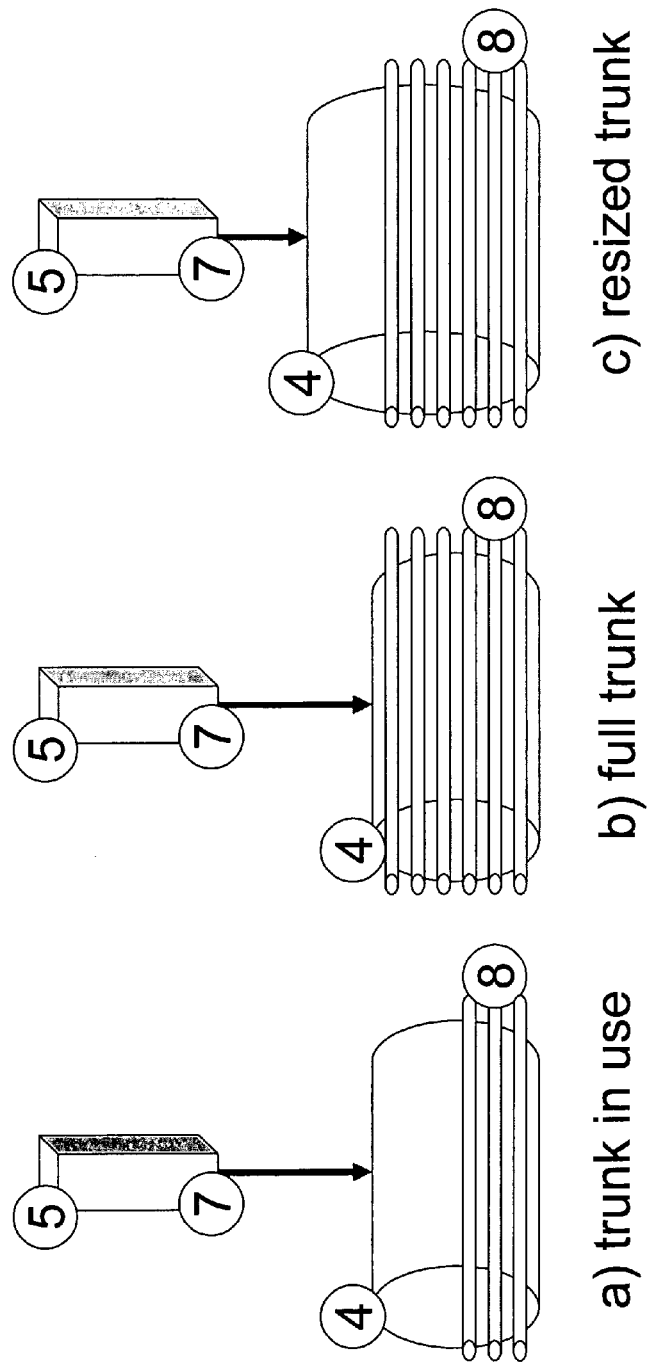

METHOD FOR TIME-SYNCHRONOUS DATA TRANSFER

BACKGROUND OF THE INVENTION

The invention concerns a method for time-synchronous data transfer, particularly of voice and video messages, over a network, particularly the Internet, between at least two terminals where a connection between the terminals is set up using the SIP protocol and at least one SIP server.

Methods for transfer of time-synchronous data, such as voice data, over networks, particularly over the Internet, are gaining importance, because for private users as well as for enterprises cost saving on telephone calls are possible. For conducting telephone calls between two terminals over a network, particularly using the Internet protocol, means for signalling call set-up and tear-down are required. SIP, the Session Initiation Protocol is one of the protocols used for this purpose. It was standardized by the IETF, the Internet Engineering Task Force.

A caller may send a SIP message for setting up a call by using his/her terminal. The message notifies the callee that the caller intends to set up a call. The terminal of the callee would then for example ring and notify the terminal of the caller by another SIP message that ringing has started. If the callee operates her/his terminal such that it accepts the call, then the terminal sends another SIP message to the terminal of the caller for notifying it that now transmission of time-synchronous data, for example voice or video data, can start. The SIP protocol is also used for signalling tear-down of a connection.

Establishing a concrete voice connection and coding and sending time-synchronous voice data is not supported by SIP. For this, the terminals communicate with each other, for example, by negotiating about the kind of connection or data transfer to use and a coding method for voice data. SIP supports establishing a connection insofar, as it includes an exchange of terminal properties. This includes the kinds of voice coding that the terminals support, the addresses of the terminals to which voice traffic is to be sent, and some other terminal specific properties.

Another functionality of SIP is finding a callee at his/her current location. The first message from a caller to a callee if typically not sent directly to the callee's terminal, but to a SIP server, which is usually configured as SIP proxy server. At this server, a company XYZ provides an address sip://customer@xyz.de to one of its customers.

Now, the customer can register her/his current terminal at the SIP proxy server provided by company XYZ. His current terminal might be his work phone, his home phone, his mobile phone, or any other SIP-enabled phone. The terminal of the caller then sends the first message to sip://customer@xyz.de. There the proxy server forwards this message to the terminal that the customer has registered. The SIP server would also forward the reply of customer's terminal in the opposite direction.

As for the conventional technique, the following references are known.

Reference for Differentiated Services:
"RFC 2475 An Architecture for Differentiated Service," S. Blake, D. Black, M. Carlson, E. Davis, Z. Wang, W. Weiss, December 1998 (Format: TXT=94786 bytes) (Updated by RFC3260) (Status: INFORMATIONAL)

Reference for RSVP:
"RFC 2205 Resource ReSerVation Protocol (RSVP), Version 1 Functional Specification," R. Braden, Ed., L. Zhang, S. Berson, S. Herzog, S. Jamin, September 1997 (Format: TXT=223974 bytes) (Updated by RFC2750) (Status: PROPOSES STANDARD);

"RFC 2210 The Use of RSVP with IETF Integrated Services," J. Wroclawski, September 1997 (Format: TXT=77613 bytes) (Status: PROPOSED STANDARD)

Reference for SIP:
"RFC 3261 SIP: Session Initiation Protocol," J. Rosenberg, H. Schulzrinne, G. Camarillo, A. Johnston, J. Peterson, R. Sparks, M. Handley, E. Schooler, June 2002 (Format: TXT=647976 bytes) (Obsoletes RFC 2543) (Updated by RFC 3265) (Status: PROPOSED STANDARD).

For the known methods of transferring time-synchronous data over the basic Internet, there is the particular problem that they give no guarantees for Quality of Service (QoS), for example available bandwidth and packet delay of a connection. This may lead to bad quality of voice transmission, because packets containing the coded voice arrive in an order different to the one they were sent in, because packets are damaged or dropped during transfer, or because packets are transferred with high delay. For time-synchronous data, such as voice or video, this leads to bad QoS. The lack of QoS is one of the reasons for the limited acceptance of time-synchronous services, particularly Internet telephony, so far. Also SIP does not have any built-in mechanism to support Quality of Service (QoS) to the time-synchronous data transfer it signals.

Enhancements of the basic Internet, such as Integrated Services and Differentiated Services support QoS for Internet connections, but it requires additional signalling and network management functions. Integrating SIP signalled IP telephony or video transfer with these methods for QoS provisioning would be a significant technology improvement and it would increase the acceptance of Internet telephony, but its available is very limited, so far.

Existing suggestions on how to perform this integration are based on the idea that the telephony terminals themselves try to reserve resources for their calls by using other means of signalling, independent of SIP. An example is the Resource reSerVation Protocol (RSVP) of Integrated Services. However, this approaches do not scale sufficiently with an increasing number of users, such that existing QoS provisioning systems cannot deal with a high rate of reservation requests.

BRIEF SUMMARY OF THE INVENTION

Therefore, this invention is targeted at defining a method for transferring time-synchronous data with high quality, which is technically simple and cost-effective.

According to the invention, the goal described above is achieved by a method for transferring time-synchronous data according to patent claim 1. This method is designed and developed in a way that the SIP server analyzes the connections and/or the terminals in a way that based on this analysis an ideal bandwidth for optimizing the transfer of time-synchronous data is determined.

BRIEF DESCRIPTION OF THE DRAWINGS

The present invention will be more apparent from the following description of preferred embodiments taking in conjunction with the accompanying drawings, in which:

FIGS. 2(a), (b), and (c) show schematic views of describing trunk control operations of the present invention; and which:

Figure 1:
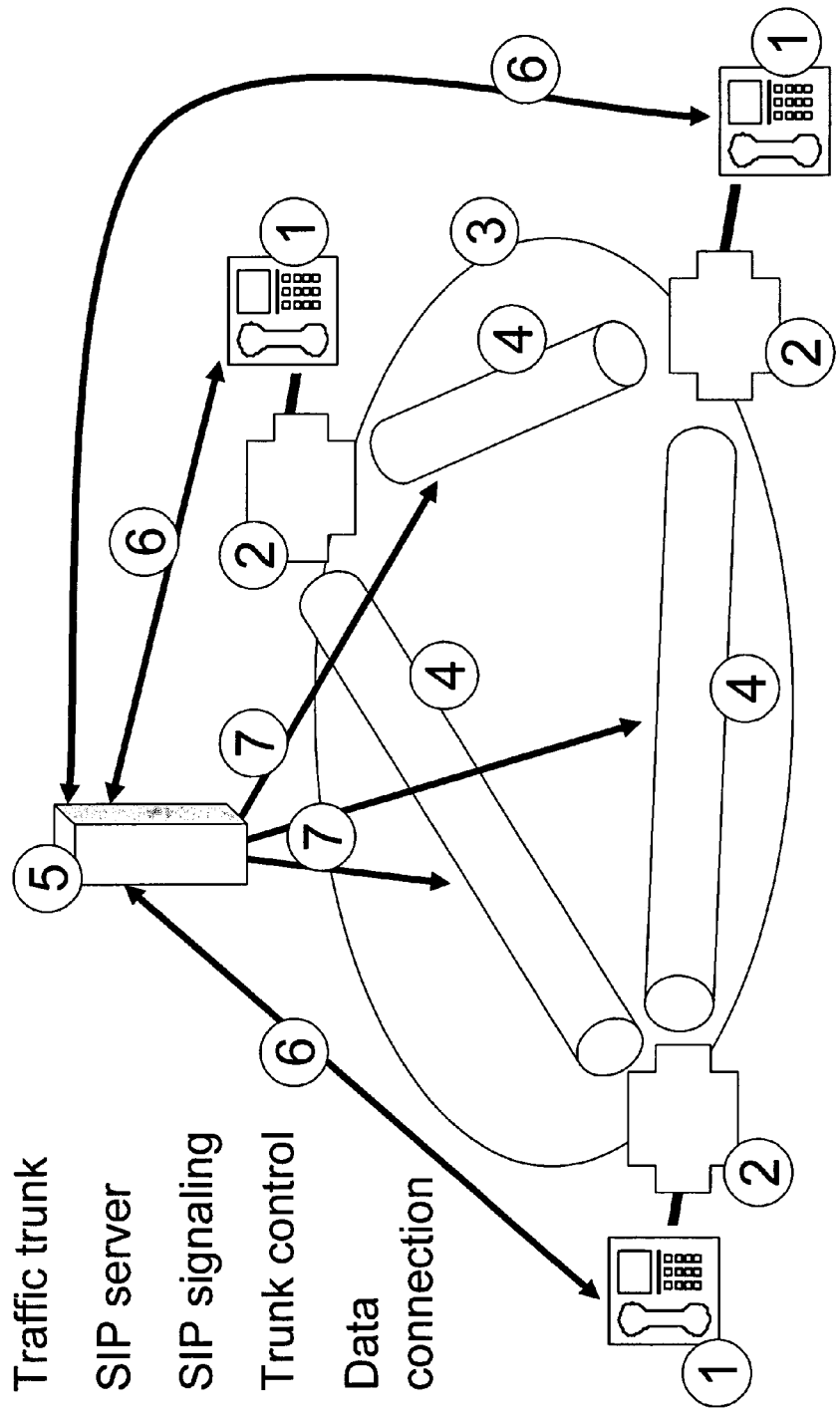
FIG. 1 shows a network which is used for explaining a method according to the present invention and which includes a SIP server and traffic trunks.

Reference numerals are added to the respective structural elements in FIGS. 1 and 2 for a better understanding of the present invention and, specifically, 1 is representative of a phone terminal; 2, an edge router; 3, a control IP network; 4, traffic trunks; 5, a SIP server; 6, SIP signaling; 7, trunk control; and 8, data connection.

DETAILED DESCRIPTION OF THE INVENTION

Within the invention it is found that for achieving sufficient QoS, no additional functionality is required for the terminals and/or the network, but that the required QoS can be achieved in a particularly simple and cost-effective way by extending the SIP server such that the connection, particularly the SIP message exchanged for signalling, and or the terminals are analyzed. Based on this analysis and with knowledge of the coding and decoding methods, an optimal bandwidth for optimizing the transfer of time-synchronous data is determined. A sufficient QoS for the data transfer can therefore be achieved without requiring additional functionality of terminals or the network, which saves costs significantly.

Now, in a very advantageous way, based on the analysis of the connection and or the terminals, a bandwidth reservation for the transfer of time-synchronous data can be made for ensuring QoS. The reservation of bandwidth could be performed by the SIP server, which is extended by this functionality. The QoS would be ensured with respect to loss of data during data transfer, as far as the transfer data rate is within the reserved bandwidth. Particularly for voice and video transmission, this method ensures good QoS.

In order to determine the required bandwidth to be reserved in a very simple way, at the analysis,the properties of the connection and/or the terminals and/or the used coding method and/or the used decoding method for time-synchronous data transfer could be determined. The analysis of the used coding method and/or decoding method is very simple, since these methods are mentioned explicitly in the SIP messages.

In an again very simple way, the reservation of bandwidth could be performed using a QoS management system. The QoS management system could be external to the SIP server and receive reservation requests from the SIP server. The QoS management system could, for example, be designed as a bandwidth broker, also called QoS server. Then bandwidth broker performs the complex task of forwarding the reservations to the individual devices in the network.

Now, if several connections between different devices are established, then these bandwidth reservations for different connections can be aggregated to at least one traffic trunk, preferably by the SIP server. This could be used for achieving scalability of the methods described above in the network.

With respect to high flexibility, the bandwidth of the traffic trunk could be chosen larger than the actual bandwidth required by the connections. This would allow quickly providing bandwidth to new connections to be established, without requesting additional bandwidth at the bandwidth management system.

With respect to an effective reservation of bandwidth, a traffic trunk could aggregate reservations between two end points, particularly access routers or edge routers. Access routers or edge routers could be devices connecting a large number of terminals to the Internet.

With respect to high flexibility concerning new connections to be established, a new connection between a first terminal and a second terminal via at least two end points could be mapped to the respective traffic trunk. This trunk would be the already existing traffic trunk between the two end points. This would largely avoid the creation of new traffic trunk at connection establishment as well as the related effort.

For ensuring good QoS, the SIP server could reject establishment of a new connection, if the required bandwidth of the new connection exceeds the remaining available bandwidth of the trunk. This would ensure that the QoS of already existing connections would not be deteriorated.

Alternatively, the SIP server could reserve additional bandwidth for the concerned traffic trunk, if the required bandwidth of a new connection to be established exceeds the remaining available bandwidth of the trunk. This would ensure that very few requested connections would be rejected, and that in most cases a connection would be established.

With respect to cost-effectiveness, the SIP server could reduce the reserved bandwidth for a traffic trunk if the bandwidth required by the connections is much less that the reserved bandwidth.

With respect to flexibility, the reservation of bandwidth, particularly between all end points server by the SIP server, could be performed before any connection is established. This can be based on an analysis of reservations in the past.

When the invented method is available, terminals have—with some restrictions—a free choice of the SIP server to use. The SIP server is realized In general as a SIP proxy server. A service provider could offer two different SIP servers, one offering QoS according to the methods described above, and a conventional one without this function. Then the service provider could charge a higher price for connections with QoS guarantees, while also offering connections without QoS guarantees for a lower price or free of charge to users who do not require QoS guarantees.

Several variants of the invention can be implemented. Particularly, for the selection of the SIP server that performs the analysis, particularly of the SIP messages, and the reservation of resources for a traffic trunk as well as the modifications of reservations for the traffic trunks. The SIP server could be selected out of a chain of SIP servers involved in forwarding SIP signalling messages. The reservation and modification of reservation for traffic trunks could be based on the observation of actual observed usage of resources.

Another variant would be an explicit signalling of QoS requirements of coding methods and decoding methods used by the terminals to the SIP server. For this purpose, for example an extension of the SIP protocol could be defined and used. This would imply that the SIP server no longer would need to analyze SIP messages with respect to properties of the terminals, particularly concerning the used coding method in order to determine the required QoS parameters of the connection. Instead, it would receive these parameters directly from the terminals using the SIP extensions for signalling.

The invention offers a technically feasible and scalable way of integrating SIP-signalled transfer of time-synchronous data with QoS guarantees in networks. Preferably, the QoS parameters are derived from an analysis of SIP messages while the messages are forwarded by the SIP server. An advantage of the invention is that no extensions of the SIP protocol are required for offering QoS guarantees. Resource reservations for individual connections are aggregated by the SIP server into traffic trunks. These traffic trunks can then be adapted to the observed usage of the trunks. This way, the invention is a highly scalable method that can be used for installing large Internet telephony networks. The investment in the new technology is relatively small, because only the SIP server needs to be extended. A change of the terminals is not required.

The invention claimed is:

1. A method of transmitting time-synchronous data over a network connection between at least two terminals, where between the terminals a connection is established using a Session Initialization Protocol (SIP) server and SIP protocol, said method comprising having the SIP server analyze at least one of the connection and said at least two terminals, and based on this analysis determining an ideal bandwidth for optimizing the transfer of time-synchronous data, wherein said method further comprises reserving bandwidth for the connection based on the analysis and guaranteeing Quality of Service (QoS), wherein the analysis comprises determining at least one of a data coding method for time-synchronous data transfer used by the at least two terminals and a data decoding method for time-synchronous data transfer used by the at least two terminals, wherein the reservation of bandwidth is performed by the SIP server using a QoS management system, wherein the reservations of bandwidth for a plurality of connections are aggregated into at least one traffic trunk, and wherein a bandwidth of the at least one traffic trunk is reserved and managed based on the analysis, wherein reservations of bandwidth between at least two end points are aggregated within the at least one traffic trunk, wherein, during the time when an existing connection between the at least two endpoints is mapped to the at least one traffic trunk and is established, a new connection to be established between a first terminal and a second terminal via the at least two endpoints is mapped to the at least one traffic trunk, and wherein a required bandwidth of said new connection is determined based on the analysis, and if the required bandwidth of said new connection exceeds remaining available bandwidth of the at least one traffic trunk, the SIP server performs rejecting said new connection.

2. The method as claimed in claim 1, wherein the bandwidth of the at least one traffic trunk is chosen larger than an actual required bandwidth.

3. The method according to claim 1, wherein the SIP server reduces the reserved bandwidth for the plurality of connections aggregated into the at least one traffic trunk if a bandwidth required by the plurality of connections is less than the reserved bandwidth.

4. The method according to claim 1, wherein the reservation of bandwidth between all end points served by the SIP server, occurs before the plurality of connections are established.

* * * * *

UNITED STATES PATENT AND TRADEMARK OFFICE
CERTIFICATE OF CORRECTION

PATENT NO.         : 8,370,497 B2
APPLICATION NO.    : 10/294768
DATED              : February 5, 2013
INVENTOR(S)        : Quittek Page 1 of 1

It is certified that error appears in the above-identified patent and that said Letters Patent is hereby corrected as shown below:

On the Title Page

Page 2, Column 2, Item [56], Line 2: Delete "Interent" and insert -- Internet --

In the Specification

Column 2, Line 50-51: Delete "data according to patent claim 1." and insert -- data. --

Column 3, Line 32: Delete "analysis,the" and insert -- analysis the --

Column 4, Line 25: Delete "In" and insert -- in --

Signed and Sealed this
Twenty-first Day of October, 2014

Michelle K. Lee
*Deputy Director of the United States Patent and Trademark Office*